(12) United States Patent
Stolpman et al.

(10) Patent No.: US 7,385,915 B2
(45) Date of Patent: Jun. 10, 2008

(54) APPARATUS, AND ASSOCIATED METHOD, FOR FACILITATING COMMUNICATION ALLOCATION IN A RADIO COMMUNICATION SYSTEM

(75) Inventors: Victor Stolpman, Dallas, TX (US); John Terry, Garland, TX (US)

(73) Assignee: Nokia Corporation, Espoo (FI)

( * ) Notice: Subject to any disclaimer, the term of this patent is extended or adjusted under 35 U.S.C. 154(b) by 1057 days.

(21) Appl. No.: 10/210,743

(22) Filed: Jul. 31, 2002

(65) Prior Publication Data

US 2004/0022180 A1    Feb. 5, 2004

(51) Int. Cl.
*H04J 11/00* (2006.01)

(52) U.S. Cl. .................... 370/208; 370/329

(58) Field of Classification Search ............. None
See application file for complete search history.

(56) References Cited

U.S. PATENT DOCUMENTS

| | | | | |
|---|---|---|---|---|
| 6,005,893 | A * | 12/1999 | Hyll | 375/260 |
| 6,128,348 | A * | 10/2000 | Kao et al. | 375/260 |
| 6,289,000 | B1 * | 9/2001 | Yonge, III | 370/203 |
| 7,072,315 | B1 * | 7/2006 | Liu et al. | 370/329 |
| 2003/0058786 | A1 * | 3/2003 | Sato et al. | 370/203 |
| 2003/0072379 | A1 * | 4/2003 | Ketchum | 375/260 |
| 2003/0128658 | A1 * | 7/2003 | Walton et al. | 370/208 |
| 2003/0139196 | A1 * | 7/2003 | Medvedev et al. | 455/522 |
| 2003/0161282 | A1 * | 8/2003 | Medvedev et al. | 370/329 |
| 2003/0193889 | A1 * | 10/2003 | Jacobsen | 370/208 |
| 2003/0235255 | A1 * | 12/2003 | Ketchum et al. | 375/285 |
| 2004/0022180 | A1 | 2/2004 | Stolpman et al. | |

FOREIGN PATENT DOCUMENTS

| | | |
|---|---|---|
| WO | WO 02/062002 A1 | 8/2002 |
| WO | WO 03/092212 A1 | 11/2003 |
| WO | WO 2005/015748 | 2/2005 |
| WO | WO 2005/018187 A2 | 2/2005 |

OTHER PUBLICATIONS

International Search Report for PCT Application No. PCT/IB2006/001798; Filed Jun. 29, 2006; Date of Completion Jan. 11, 2007; Date of Mailing Jan. 15, 2007.
Written Opinion for PCT Application No. PCT/IB2006/001798; Filed Jun. 29, 2006.
Peter Trifonov, Elena Costa, Egon Schulz; *Adaptive Multilevel Coding in OFDM Systems*; Vehicular Technology Conference; May 30-Jun. 1, 2005; pp. 1566-1570; vol. 3; Section II-C.

(Continued)

*Primary Examiner*—Edan Orgad
*Assistant Examiner*—Jung Park
(74) *Attorney, Agent, or Firm*—Alston & Bird LLP

(57) ABSTRACT

Apparatus, and an associated method, for facilitating optimization of the communication capacity of a communication system. A selector is coupled to receive channel state information associated with the channel conditions upon subcarriers defined pursuant to an OFDM (orthogonal frequency division multiplexing) the selector operates to select communication allocation of the data to be communicated on the different ones of the subcarriers. Selection is made pursuant to a selected optimization scheme. And, bit and power profiles are formed that are utilized to control the modulation scheme by which data is modulated upon the different subcarriers. As channel conditions change, the communication allocations are adaptively altered.

18 Claims, 4 Drawing Sheets

OTHER PUBLICATIONS

Cheong Yui Wong et al., Multiuser OFDM With Adaptive Subcarrier, Bit, and Power Allocation, IEEE Journal on Selected Areas in Communications, IEEE Service Center, Piscataway, US, pp. 1747-1758, vol. 17, No. 10, Oct. 1999.

Hou J et al., "Multilevel Coding With Low-Density Parity-Check Component Codes," Globecom '01. 2001 IEEE Global Telecommunications Conference, San Antonio, TX, Nov. 25-29, 2001, IEEE Global Telecommunications Conference, New York, NY: IEEE, US, pp. 1016-1020, vol. 2 of 6, Nov. 25, 2001.

Partial International Search Report for PCT/IB2006/001798, dated Oct. 13, 2006.

* cited by examiner

FIG. 3

| $X_1(1)$ | $X_1(2)$ | ... | $X_1(M)$ |
| $X_2(1)$ | $X_2(2)$ | ... | $X_2(M)$ |
| ... | ... | ... | ... |
| $X_N(1)$ | $X_N(2)$ | ... | $X_N(M)$ |

92

94 — Detect Channel State Information

96 — Select Communication Allocation To Each Of The Communication Channels

APPARATUS, AND ASSOCIATED METHOD, FOR FACILITATING COMMUNICATION ALLOCATION IN A RADIO COMMUNICATION SYSTEM

The present invention relates generally to a manner by which to facilitate efficient utilization of the communication capacity of a WLAN (wireless local area network), or other communication system, that utilizes an MCM (multi carrier modulation) scheme, such as OFDM (orthogonal frequency division modulation). More particularly, the present invention relates to apparatus, and an associated method, that dynamically selects the manner by which OFDM, or other, modulated symbols, are formed and allocated to OFDM subcarriers, or other channels, to optimize communication of data.

Channel state information is used to determine selection of the manner by which data is modulated on individual ones of the subcarriers, or other channels, all according to a selected optimization scheme. Modulation schemes of differing complexities are selected for individual ones of the channels, depending upon the channel state information. And, thereby, communications can be optimized for the channel conditions. As the channel conditions change on different ones of the channels, modulation schemes are correspondingly reselected.

BACKGROUND OF THE INVENTION

The need to communicate data is an endemic necessity of modern society. Data is communicated through operation of a communication system. In a communication system, the data is communicated between a sending a station and a receiving station. The sending and receiving stations are connected together by way of a communication channel.

Data that is to be communicated by the sending station is converted into a form to permit its communication upon the communication channel. When the data is communicated upon the communication channel, the data is delivered to the receiving station. Once delivered at the receiving station, the informational content of the data is recovered.

A wide variety of different types of communication systems have been developed and are regularly utilized to effectuate communication of information between the sending and receiving stations. And, new types of communication systems have been, and continue to be, developed and constructed as a result of advancements in communication technologies.

A radio communication system is exemplary of a type of communication system that has benefited from advancements in communication technologies. In a radio communication system, radio links are utilized upon which to define communication channels that extend between sending and receiving stations operable therein. The need otherwise to utilize fixed, wireline connections upon which to define communication channels is obviated. Reduced infrastructure costs are, accordingly, generally associated with radio communication systems. And, radio communication systems can be constructed to permit one or both of the sending and receiving stations to be mobile.

The radio links, upon which the communication channels are defined, are formed upon a portion of the electromagnetic spectrum. The communication capacity of a radio communication system is, however, sometimes constricted by bandwidth limitations associated with the bandwidth of the electromagnetic spectrum available to a communication system upon which to form communication channels. When the communication capacity of the communication system is constrained in this manner, the communication capacity of the system can be increased only through more efficient utilization of the allocated bandwidth.

Digital communication techniques are implemented in many communication systems, and the use of such techniques permits the communication capacity of a communication system to be increased. The use of digital communication techniques generally permit the bandwidth allocated to the communication system to be utilized more efficiently.

Digital communication techniques typically involve digitizing data that is to be communicated into digital form to form digital bits. The digitized bits are sometimes then formatted into sequences referred to as packets or frames. While different communication systems define the groupings of digital bits in different manners, the terms packet and frame shall, at times, be used interchangeably herein to refer to any set, or group, of digital data that is communicated during operation of a communication system.

Sequences of the data forming the packets or frames can be communicated at discrete intervals and thereafter connected theretogether to recreate the informational content of the data. Because packets or frames of data can be communicated at the discrete intervals, a frequency band need not be dedicated solely for the communication of data generated by one sending station for transmission to one receiving station, as conventionally required in circuit-switched communications. Instead, the frequency band can be shared amongst a plurality of different sending and receiving station pairs. Because the same frequency band, e.g., radio link, can be utilized to effectuate communications by the plurality of pairs of communication stations, improved communication capacity is possible.

Conventional local area networks (LANs) communicate packets of data to effectuate communications between sending and receiving stations defined therein. Wireless networks, operable in manners analogous to LANs, referred to as WLANs (wireless local area networks) have also been developed and are utilized to communicate data over a radio link.

The standards of operation of an exemplary WLAN are set forth in the IEEE (Institute of Electrical and Electronic Engineers) 802.11 specification. The system standard set forth in the specification provides for multi-user communications.

At least one implementation of a WLAN anticipates, or otherwise uses, OFDM (orthogonal frequency division multiplexing) techniques. OFDM effectively forms a hybrid of a multi-carrier modulation (MCM) and frequency shift keying (FSK) modulation. Frequency-divided carrier frequencies are defined in an OFDM system, and the carriers are selected to be orthogonal to one another, such as by separating the carriers by integer multiples of the inverses of symbol durations of parallel bit streams that are to be applied thereto. The orthogonal carriers are transmitted simultaneously thereby permitting an entire allocated channel to be occupied through an aggregated sum of narrow, orthogonal subbands.

Various techniques are used in conventional, wireline communication systems that utilize OFDM. In particular, a so-called, water-filling technique is sometimes utilized to facilitate optimal utilization of the subcarriers defined in the OFDM system. However, such conventional water-filling techniques do not provide a dynamic allocation scheme needed for a radio application. That is, the communication characteristics of channels defined upon a radio link are much more likely to be adaptively alterable due to fading characteristics regularly exhibited upon radio channels. And, a more dynamic allocation scheme than that provided by a water-filling technique for use in a radio communication system.

Accordingly, an improved manner by which to allocate communications on the subcarriers are defined in a communication system, such as a WLAN, that utilizes OFDM techniques would be advantageous.

It is in light of this background information related to communication systems that utilize OFDM, or other multicarrier modulation techniques, that the significant improvements of the present invention have evolved.

SUMMARY OF THE INVENTION

The present invention, accordingly, advantageously provides apparatus, and an associated method, by which to facilitate efficient utilization of the communication capacity of a WLAN (wireless local area network), or other communication system, that utilizes an MCM (multi carrier modulation) technique, such as an OFDM (orthogonal frequency division multiplexing) technique.

Through operation of an embodiment of the present invention, a manner by which OFDM, or other, modulated symbols are formed and allocated to OFDM subcarriers, or other channels, is dynamically selected to optimize communication of data.

Selection of the manner by which data is modulated on individual ones of the subcarriers, or other channels, is based upon channel state information of the channels upon which the data is communicated. And, the selection is made in a manner to optimize communications according to a selected optimization scheme. Modulation schemes of differing complexities are selected for individual ones of the channels, depending upon the channel state information. And, thereby, communications can be optimized for the channel conditions. As the channel conditions change on different ones of the channels, the modulation schemes are correspondingly reselected.

In one aspect of the present invention, a value of a bit profile and a value of a power profile is determined according to an optimization scheme, based upon channel state information. Values of the bit profile and of the power profile are used to select the manner by which modulated symbols are formed upon each of the subcarriers, or other channels, upon which data is to be communicated. For instance, if the communication characteristics on a subcarrier, or other channel, are good, then the modulation scheme selected to be used is fairly complex, that is, is of a more complex symbol constellation set. And, conversely, if the communication conditions on the channel are poor, then the modulation scheme is selected to be relatively noncomplex, i.e., the constellation set is of a reduced number of symbols. As communication conditions change on the subcarriers, the modulations used to form modulation symbols on individual ones of the subcarriers, or other channels, correspondingly change.

In another aspect of the present invention, selection of the bit and power profiles determinative of the communication allocation to the subcarriers, or channels otherwise-formed, is based upon a set of rules. Channel state information available to the sending station is applied to the rules. And, the rules operate upon the channel state information to form the bit and power profiles. The rules are selectable, and different rules are selected to optimize different communication performance criteria.

In another aspect of the present invention, the communication performance criteria that is optimized is the total data rate upon the subcarriers, or other channels, while maintaining a constraint on the aggregate power level of the data that is communicated.

And, in another aspect of the present invention, the communication performance criteria optimized by the rules is the aggregate power level of the data communicated on all of the channels, while constraining the total data rate of the data that is communicated.

And in another aspect of the present invention, the communication performance criteria that is selected to be optimized through application of the rules is the minimization of the average signal error rate of the data communicated upon the subcarriers, or other channels, while also maintaining a constraint on the aggregate power levels of the communicated data.

In another aspect of the present invention, once a packet of data formed at a sending station according to a rules-based optimization scheme, and communicated to a receiving station, the data is operated upon at the receiving station to recover the informational content thereof. Channel state information, representative of the channel conditions of the subcarriers, or other channels upon which the data is communicated to the receiving station is provided to a rules-based selector. The rules-based selector forms a bit profile and a power profile responsive to the channel state information provided thereto and corresponding to the rules contained at the selector. The bit and power profiles are used at the receive circuitry, such as the demodulator circuitry thereof, to extract and recover the informational content of the data communicated thereto. By operating upon the data in a manner substantially reverse to the manner by which the data is modulated at the sending station, the informational content of the data is able to be recovered.

In one implementation, a WLAN (wireless local are network) that utilizes OFDM includes a sending station, such as an access point or a mobile station, that forms and allocates communication data according to a rules-based selector. The rules-based selector forms bit and power profiles to be used to allocate the communication data to optimize a communication performance criteria. And, a receiving station, also formed of a mobile station or an access point, utilizes a corresponding rules-based selector to facilitate demodulation and recovery operations of the communicated data.

As the channel conditions change, the channel state information applied to the rules-based selectors correspondingly change. Therefore, dynamic communication allocations are effectuable, to optimize the communications between the sending and receiving stations.

In these and other aspects, therefore, apparatus, and an associated method, is provided for a frequency-division multiplexed communication system. The communication system defines a first communication channel, and at least a second communication channel upon which data, formed of data symbols, is communicated. Selection of communication allocation upon the first and at least second communication channels by which to communicate the data thereon is facilitated. A selector is coupled to receive indications of channel state information upon at least one of the first and at least second channels. The selector selects the communication allocation to each of the first and at least second channels upon which to communicate the selected portions of the data according to a selected optimization criteria. The communication allocation is selected to facilitate attainment of the selected optimization criteria.

A more complete appreciation of the present invention and the scope thereof can be obtained from the accompanying drawings that are briefly summarized below, the following detailed description of the presently-preferred embodiments of the invention, and the appended claims.

BRIEF DESCRIPTION OF THE DRAWINGS

FIG. 3 illustrates an exemplary packet of data formed during operation of an embodiment of the present invention.

FIG. 4 illustrates a method flow diagram listing the method steps of the method of operation of an embodiment of the present invention.

DETAILED DESCRIPTION

Figure 1:
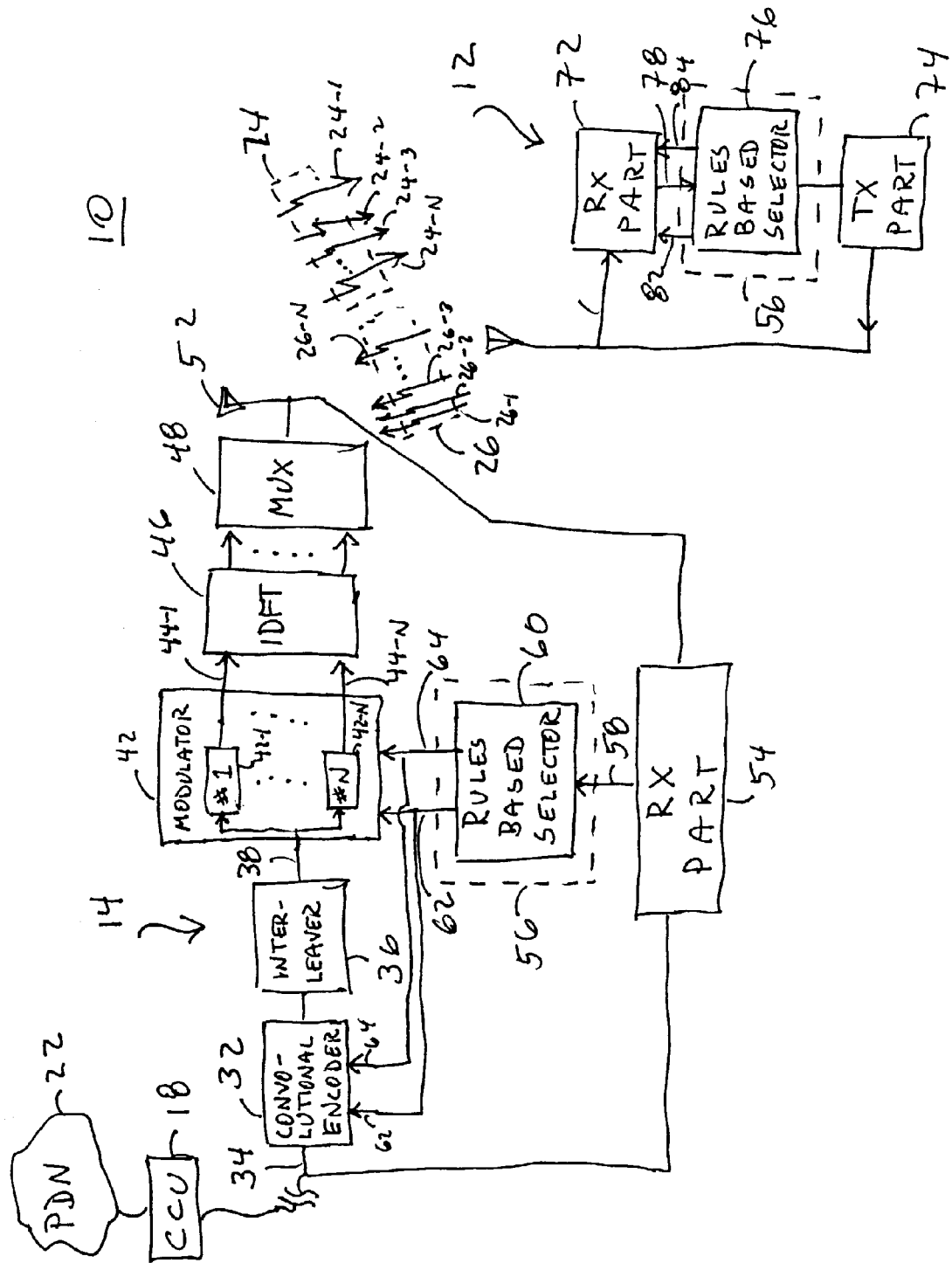
FIG. 1 illustrates a functional block diagram of a radio communication system in which an embodiment of the present invention is operable.

Referring first to FIG. 1, a radio communication system, shown generally at 10, provides for radio communications with mobile stations, of which the mobile station 12 is representative.

In the exemplary implementation, the communication system 10 forms a WLAN (wireless local area network) constructed to be operable pursuant generally to a variant of the IEEE 802.11 communication standard and that, here, utilizes OFDM (orthogonal frequency division multiplexing) communication techniques. While the following description of the exemplary implementation of the present invention shall describe operation of the present invention with respect to its exemplary implementation in which the communication system is formed of such a WLAN, other communication systems can analogously be represented. And, operation of an embodiment of the present invention is analogously also operable in such other communication systems. Description of operation of an embodiment of the present invention, accordingly, is analogous to that described below with respect to its implementation in the WLAN.

The WLAN includes a plurality of spaced-apart access points (APs), of which the access point 14 is representative. The access points form portions of the network part of the WLAN and are positioned at spaced-apart locations throughout an area that is to be encompassed by the WLAN. While only a single, representative access point is shown in the figure, a conventional WLAN includes, typically, a plurality of access points.

The access point 14 is coupled to a central control unit (CCU) 18. The central control unit 18 provides control functions to various aspects of operation of the WLAN. And, in turn, the central control unit is connected to an external communication network, here a packet data network (PDN) 22, such as the internet backbone. Other communication devices, not separately shown, are connected, or are otherwise coupled, to the packet data network. Communication paths are formable through the network part of the WLAN, upon radio links extending between the network part of the WLAN and the mobile station 12 to be delivered thereto.

Two-way communications are effectuable between the access point 14 and the mobile station 12 by way of forward-link channels defined upon forward links 24 and reverse-link channels defined upon reverse links 26. As, in the exemplary implementation, OFDM techniques are utilized, the forward and reverse link channels are defined upon separate, orthogonal subcarriers, here designated at 24-1, 24-2, 24-3 . . . and 24-N on the forward link and 26-1, 26-2, 26-3, . . . 26-N on the reverse link.

Both the mobile station 12 and the access point 14 include radio transceiver circuitry capable of both sending and receiving data upon the channels defined upon the forward and reverse links. In the exemplary implementation, the present invention is embodied at both the transmit and receive parts of the mobile station and access point.

For purposes of illustration of exemplary operation of an embodiment of the present invention, an embodiment thereof is shown to be implemented at the transmit part of the access point and at the receive part of the mobile station. While not separately shown, in a typical implementation, the transmit part of the mobile station and the receive part of the access point also includes corresponding structure and operate in manners analogous to the transmit part of the access point and the receive part of the mobile station, respectively.

Here, the transmit part of the access point is shown to include a convolutional encoder 32 to which source data is applied on the line 34. The encoder convolutionally encodes the sourced data applied thereto and applies the encoded data to an interleaver 36 that operates to interleave the data according to a selected interleaving scheme. Encoded, interleaved data, formed on the line 38 is provided to a modulator 42. The modulator includes a plurality of modulator elements 42-1 through 42-N corresponding to the number of orthogonal subcarriers upon which the data is to be communicated.

Each of the modulating elements is capable of forming modulated symbols according to separately-selectable modulation schemes, selected pursuant to an embodiment of the present invention. And, modulated symbols, formed by separate ones of the modulating elements are formed on the lines 44-1 through 44-N, respectively.

The modulated symbols are applied to an inverse discrete fourier transformer (IDFT) 46, and transformed symbols are multiplexed together at a multiplexer (MUX) 48 and thereafter applied to one or more antenna transducers 52.

The access point also includes a receive part 54 and apparatus 56 of an embodiment of the present invention. The apparatus is coupled to the receive part, here represented by the line 58, to receive channel state information indicative of channel state characteristics on the forward link subcarriers, or channels otherwise defined.

The apparatus includes a rules-based selector 60 that operates to generate the values of bit and power profiles on the lines 62 and 64 that are applied to the transmit part of the access point. Values generated on the lines 62 and 64 are used at the transmit part, amongst other things, to select the manner by which the data provided to the modulating elements of the modulator are modulated. And, in the exemplary implementation, the encoder 32 forms a Reed-Solomon encoder, and values generated on the lines 62 and 64 are also determinative, in part, of the manner by which the encoder encodes the source data provided thereto.

The rules-based selector operates to select values for generation on the lines 62 and 64 to optimize communications on the radio link near the forward link, according to a selected optimization scheme. The rules optimize, for instance, the maximum total data throughput rate upon the forward link while maintaining a constraint on the aggregate power levels at which the data is communicated. Alternately, the rules-based selector operates to generate values on the lines 62 and 64 to provide a scheme by which to minimize the total aggregate power levels of the data communicated on the separate subcarriers while maintaining a constraint on the total data throughput rate. And, rules-based selector also selectively operates to minimize an average symbol error rate while constraining the total power level at which the data is communicated on the different ones of the subcarriers.

As channel conditions change, indicated by the channel state information provided to the apparatus 56, the values of the bit and power profiles formed on the lines 62 and 64 correspondingly change, if appropriate. And, the operation of the modulating elements 42 of the modulator are correspondingly altered.

The mobile station 12 is shown also to include a receive part 72 and a transmit part 74. And, the mobile station also includes apparatus 56 of an embodiment of the present invention. The apparatus 56 also includes a rules-based selector, here designated at 76, and here coupled to receive channel state information by way of the lines 78 extending from the receive part 72. Channel state information is used by the selector 76 to generate bit and power profiles on the lines 82 and 84 that are, in turn, provided to the receive part 72 and used thereat to recover the informational content of the data received at the mobile station. Because the channel state information identifies the channel characteristics of the same channels, the channel state information provided on the line 78 to the rule selector 76 corresponds to the channel state information provided on the lines 58 and applied to the selector 60. By utilizing the same rules at the selectors 60 and 76, the values generated on the lines 82 and 84 correspond to the values generated on the lines 62 and 64. Thereby, the selectors 60 and 76 act in conjunction with one another.

Figure 2:
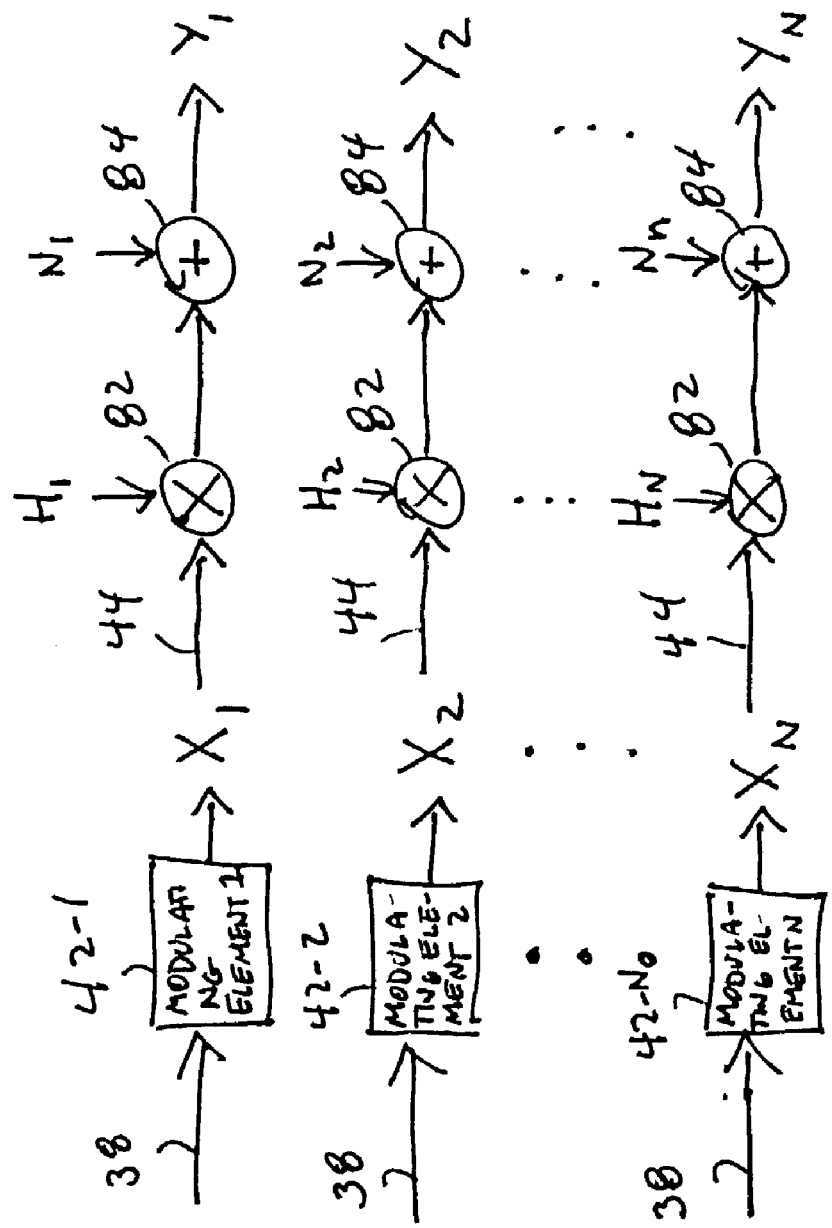
FIG. 2 illustrates another representation of the communication system shown in FIG. 1.

FIG. 2 also illustrates portions of the communication system 10 shown in FIG. 1. Here, separate lines 38 are shown to extend to separate modulating elements 42 at which different types of modulations are performed upon the data bits applied thereto. For instance, individual ones of the modulating elements are selectively caused to modulate single, or multi-bits of the data bits applied thereto according to a selected modulation scheme to form modulated symbols on the lines 44. The symbols are identified by $X_1$, $X_2$, etc. Each value X defines a modulation symbol. Values of the modulation symbols are sent upon subcarriers, or channels otherwise defined, that have channel characteristics $H_1$, etc., here indicated at the elements 82. And, noise is added onto the values of the data, here indicated at the elements 84, and identified by noise components $N_1$, etc. The values of the modulated symbols, when received at the mobile station, are identified by $Y_1$, $Y_2$, etc.

Through appropriate selection of the modulations performed by the modulating elements 42-1 through 42-N, communications upon the subcarriers according to a selected optimization scheme can be effectuated. As channel conditions change, the modulation schemes by which the modulating elements modulate the data bits applied thereto are changeable, as appropriate, responsive to the changing channel conditions. The lines 62 and 64 extending to individual ones of the modulating elements are representative of the values applied to the modulating elements to cause appropriate modulations to be performed at individual ones of the modulating elements.

Figure 3:
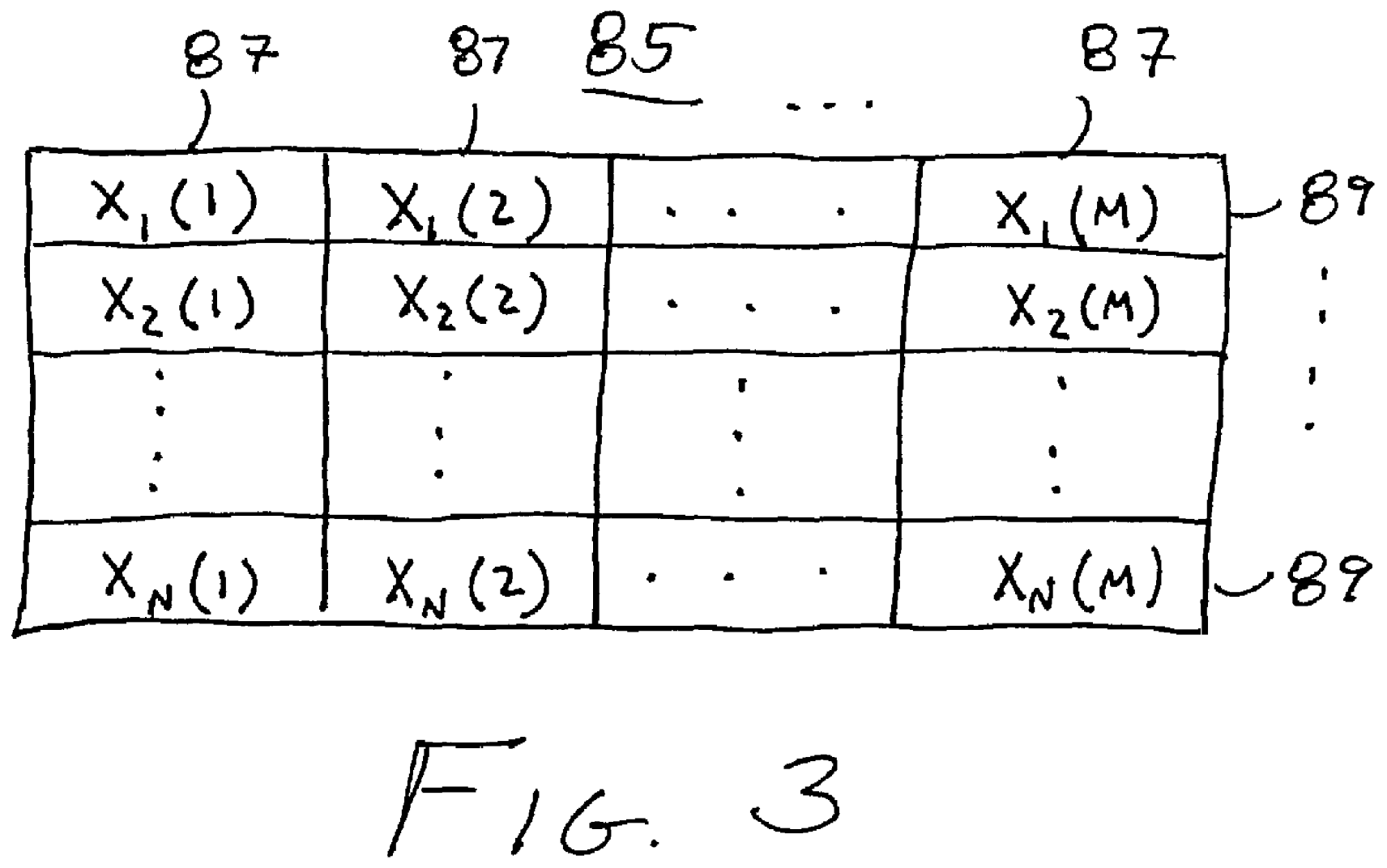

FIG. 3 illustrates an exemplary data packet 85 transmitted during operation of the communication system 10, shown in FIGS. 1 and 2. A data packet is formed of modulation symbols $X_1$ through $X_N$, over M symbol intervals. That is to say, each column 87 defines a symbol interval, and M symbol intervals are shown. And each row 89 defines symbols that are generated for transmission upon separate subcarriers. Each modulation symbol is formed of one or more data bits applied to the respective modulating elements, as noted above.

Given the channel state information at the transmitter and receiver, the communication system allocates bits and a total fixed power across parallel subchannels to maximize the data throughput given a minimum performance constraint on each subchannel. Information Theory determines the theoretical maximum informational data rate through parallel channels via a "water-filling" power allocation scheme. The theoretic solution relies on a channel-coding scheme that achieves Shannon's channel capacity for each subchannel. A base-band modulation scheme is used, such as BPSK or QAM for bit assignments. Thus, the Symbol Error Rate (SER) is bounded strictly away from zero for finite transmission power in the presence of random noise. The total data rate is maximized as:

$$\max R = \sum_{i=1}^{N} b_i$$

subject to a total power constraint.

Under the same channel assumptions, the communication system alternately allocates bits with a total fixed rate and power across parallel subchannels to minimize the necessary total power given minimum performance constraints on each subchannel. The problem formulation is similar to the above problem, but instead of maximizing the total rate the total transmitter power is minimized as:

$$\min P = \sum_{i=1}^{N} P_i$$

subject to a total date rate constraint.

Because the transmitter typically scales the individual subchannel powers to sum to the total power available at the transmitter, this problem can also be considered as a maximizing the noise margin problem.

$$J_R = \sum_{i=1}^{N} b_i + \lambda \sum_{i=i}^{N} P_i$$

And, alternately, rules can be used by which to minimize total power with constraint on total rate. Similarly, the power problem can be stated in Lagrange multiplier form as:

$$J_P = \sum_{i=1}^{N} P_i + \lambda \sum_{i=i}^{N} b_i$$

which is also straightforward to solve for power and bit assignments.

And, alternately, the rules can be selected to minimize average SER with constraint on total power. Much like the previous two problems, a Lagrange multiplier form can be stated for minimizing the average SER as follows:

$$J_E = \sum_{i=1}^{N} \in_i + \lambda \sum_{i=i}^{N} P_i$$

FIG. 4 illustrates a method flow diagram, shown generally at 92, of the method of operation of an embodiment of the present invention. The method 92 facilitates selection of allocation of first and at least second communication channels upon which to communicate data in a frequency-division, multiplex communication system.

First, and as indicated by the block 94, channel state information is detected upon at least one of the first and at least second communication channels. Then, and as indicated by the block 96, the communication allocation to each of the first and at least second channels is selected upon which to communicate selected portions of the data according to a selected optimization criteria. The communication allocation is made to facilitate attainment of the selected optimization criteria.

Thereby, a manner is provided by which to optimize the utilization of the communication capacity of a communication system according to a selected optimization technique.

The previous descriptions are of preferred examples for implementing the invention, and the scope of the invention should not necessarily be limited by this description. The scope of the present invention is defined by the following claims:

We claim:

1. In a frequency-division multiplexed communication system defining a first communication channel and at least a second communication channel upon which data, formed of data symbols, is communicated, an improvement of apparatus for facilitating selection of a communication allocation upon the first and at least second communication channels, respectively, by which to communicate the data thereon, said apparatus comprising:

a selector coupled to secure indications of channel state information upon at least one of the first and at least second channels, said selector for selecting the communication allocation to each of the first and at least second channel upon which to communicate selected portions of the data according to a selected optimization criteria, the communication allocation selected to facilitate attainment of the selected optimization criteria, wherein the selected optimization criteria according to which said selector selects the communication allocation defines a collective data throughput rate upon the first and at least second communication channels to maintain a constraint upon the collective data throughput rate.

2. The apparatus of claim 1 wherein the selected optimization criteria according to which said selector selects the communication allocation further optimizes the collective data throughput rate at least at selected performance levels upon the first and at least second communication channels.

3. The apparatus of claim 2 wherein the selected optimization criteria according to which said selector selects the communication allocation further optimizes the collective data throughput rate at a total power level less than a maximum power level.

4. The apparatus of claim 1 wherein the selected optimization criteria according to which said selector selects the communication allocation optimizes the collective data throughput rate at an optimal power level.

5. The apparatus of claim 4 wherein the selected optimization criteria according to which said selector selects the communication allocation further optimizes the collective data throughput rate at a level less than a maximum throughput rate level.

6. The apparatus of claim 5 wherein the selected optimization criteria according to which said selector selects the communication allocation optimizes the collective data throughput rate at least to attain a symbol error rate beneath a maximum symbol-error-rate level.

7. The apparatus of claim 6 wherein the said selected optimization criteria according to which said selector selects the communication allocation further optimizes the collective data throughput rate at a collective power level less than a maximum power level.

8. The apparatus of claim 1 wherein the first and at least second communication channels comprise orthogonal-frequency division multiplexed (OFDM) subcarriers and wherein the communication allocation selected by said selector selects allocation of communication of the data upon each of the OFDM subcarriers.

9. The apparatus of claim 8 wherein the data communicated during operation of the communication system comprises packet-formatted data formed of data packets and wherein selection of the communication allocation made by said selector is made for each data packet of the packet formatted data.

10. The apparatus of claim 1 wherein the frequency-division multiplexed communication system comprises a Wireless Local Area Network (WLAN) having a network part and wherein said selector is embodied at the network part of the WLAN.

11. The apparatus of claim 1 further comprising a coder coupled to receive the data prior to allocation of the first and at least second communication allocation, said coder for selectably coding the data, and wherein said selector further for selects a manner by which to code the data.

12. The apparatus of claim 11 wherein the coding selectably performed by said coder comprises linear block-coding.

13. The apparatus of claim 12 wherein the linear block-coding performed by said coder comprises Reed-Solomon coding.

14. In the frequency-division multiplexed communication system of claim 1 wherein the data communicated upon the first and at least second communication channels is sourced at a sending station, wherein the data is delivered to a receiving station, and wherein said selector comprises a first selector part positioned at the sending station to select the communication allocation by which to communicate the data to the receiving station, and a second selector part positioned at the receiving station to determine the communication allocation by which the data, delivered to the receiving station, was made at the sending station.

15. In a method of communicating in a frequency-division multiplexed communication system defining a first communication channel and at least a second communication channel upon which data, formed of data symbols, is communicated, an improvement of a method for facilitating selection of allocation of the first and at least second communication channels, respectively, to communicate the data thereon, said method comprising:

detecting channel state information upon at least one of the first and at least second communication channels; and selecting, responsive to the channel state information detected during said operation of detecting, the communication allocation to each of the first and at least second channels upon which to communicate selected portions of the data according to a selected optimization criteria, the communication allocation selected according to a selected optimization criteria that defines a collective data throughput rate upon the first and at least second communication channels to maintain a constraint upon the collective data throughput rate, the communication allocation made to facilitate attainment of the selected optimization criteria.

16. The method of claim 15 further comprising the operation of generating a power indicia value responsive to selection made during said operation of selecting.

17. The method of claim 15 wherein the selected optimization criteria optimizes a power level associated with communication of the data.

18. The method of claim 15 wherein the selected optimization criteria optimizes an error rate associated with communication of the data.

* * * * *